April 21, 1964     T. E. BELSHAW     3,129,675
RAISED DOUGHNUT FORMING MACHINE
Filed May 3, 1961     3 Sheets-Sheet 1

INVENTOR.
THOMAS E. BELSHAW
BY Barnes + Leed
ATTORNEYS

April 21, 1964 T. E. BELSHAW 3,129,675
RAISED DOUGHNUT FORMING MACHINE
Filed May 3, 1961 3 Sheets-Sheet 2

INVENTOR.
THOMAS E. BELSHAW
BY Barnes + Seed
ATTORNEYS

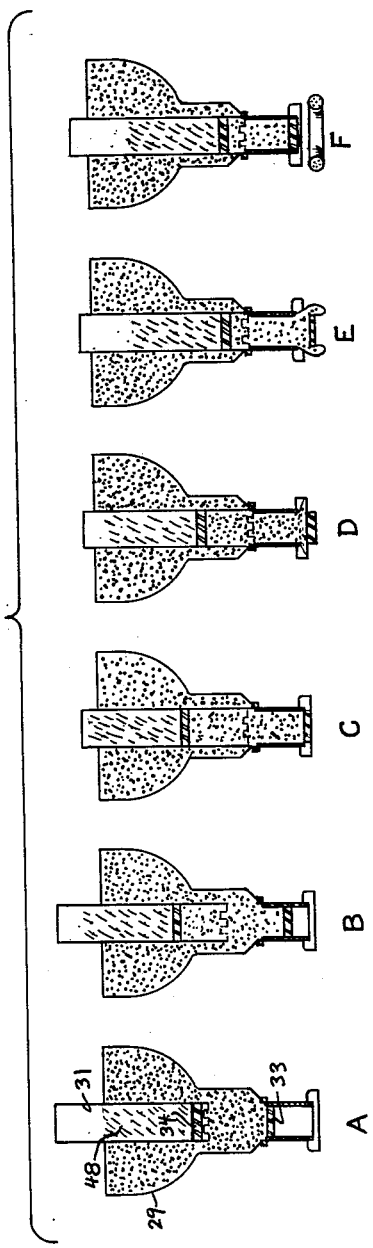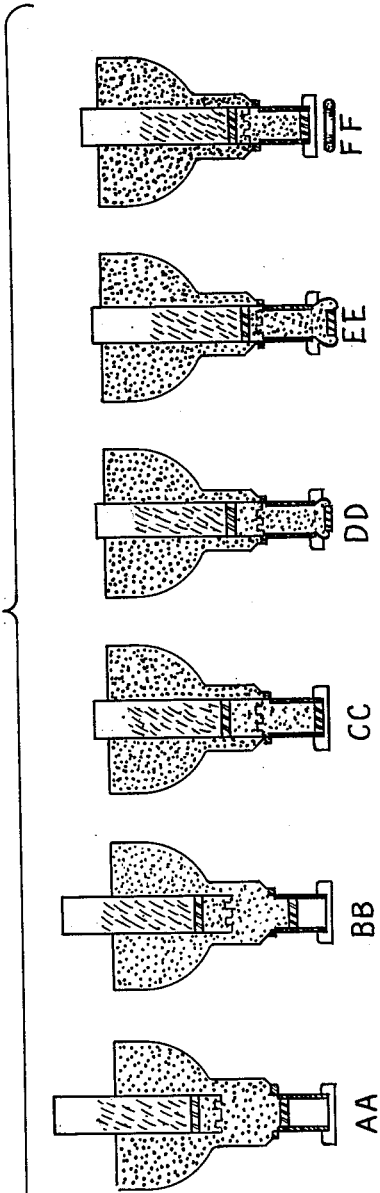

United States Patent Office 3,129,675
Patented Apr. 21, 1964

3,129,675
RAISED DOUGHNUT FORMING MACHINE
Thomas E. Belshaw, 1772 22nd Ave. S., Seattle, Wash.
Filed May 3, 1961, Ser. No. 107,544
1 Claim. (Cl. 107—14)

The present invention relates to a machine for forming raised doughnuts, and involves improvements in the device shown in my prior Patent 2,643,621, issued June 30, 1953.

Preliminary to the forming part of the operating cycle of such a machine, the dough is compressed between a metering piston and a piston-like mandrel. However, present in this dough are gases formed from the yeast fermentation and earlier trapped from the atmosphere. It is desirable that some of these gases be permitted to escape prior to actual dispensing of the dough in order to obtain a more uniform product. Accordingly, a principal object of the invention is to provide an improved dough forming machine which makes provision for the escape of some of the gases in the dough while it is being compressed during the forming part of the operating cycle, and yet which prevents intake of atmospheric air between the metering piston and mandrel during the remainder of the cycle and particularly when such are moving apart relative to one another to draw dough therebetween.

A further object is to obtain this gas escape feature while retaining ease of disassembly for cleaning.

With yet additional objects and advantages in view which, with the foregoing will appear and be understood in the course of the following description and claims, the invention consists in the novel construction and in the adaptation and combination of parts hereinafter described and claimed.

In the accompanying drawings:

FIGURE 1 is a side elevational view of the machine of the present invention, but with the hopper shown in vertical section.

FIGS. 2 and 3 are detail horizontal sectional views taken, respectively, along the lines 2—2 and 3—3 of FIG. 1.

FIGS. 6 and 7 are diagrammatic views illustrating the cycles of operation for larger and smaller doughnuts.

Figure 1:
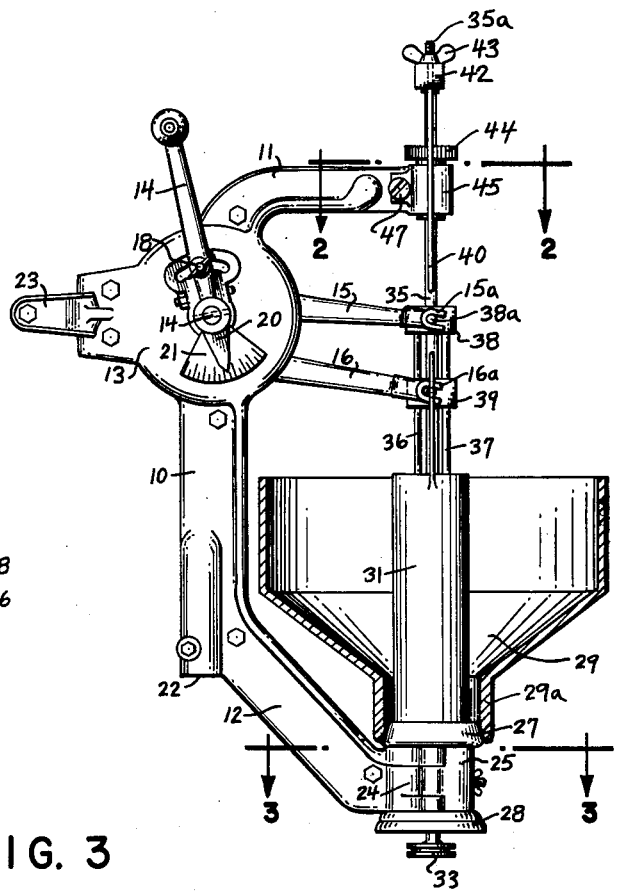
Figure 2:
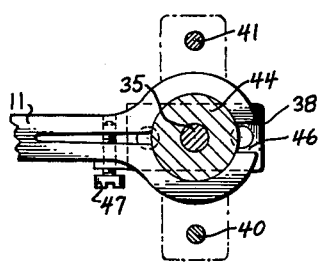
Figure 3:
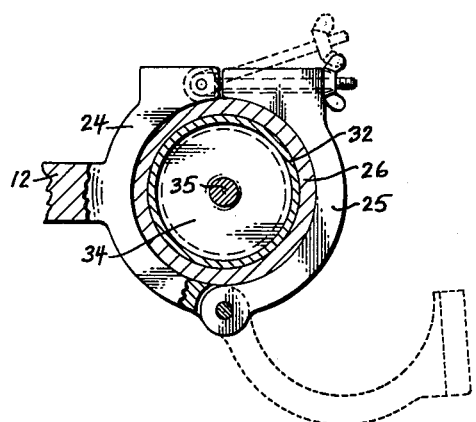
Figure 4:
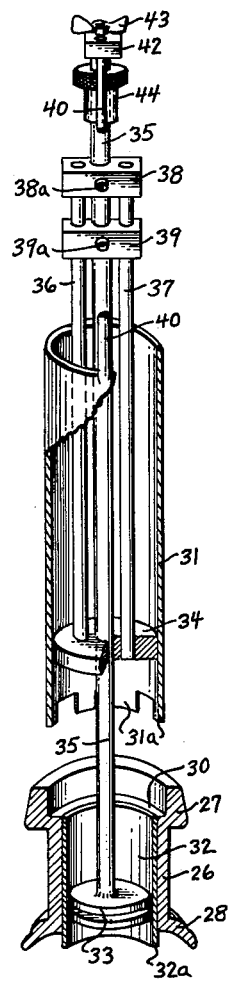
FIG. 4 is a perspective view with parts broken away and in vertical section of the dough forming and dispensing assembly shown removed from its driving mechanism and with the metering sleeve and mandrel at the top of their stroke.
Figure 5:
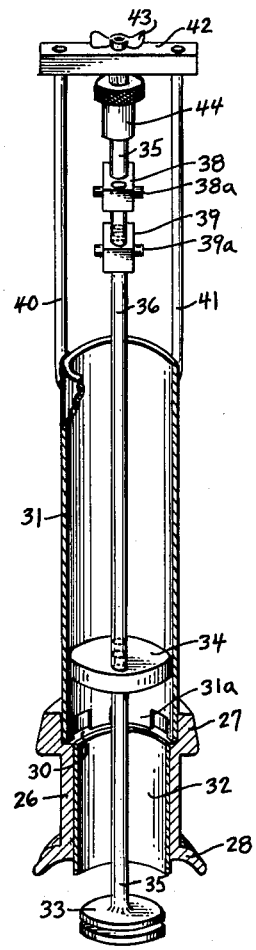
FIG. 5 is taken at right angles to FIG. 4 and with the metering sleeve and mandrel at the bottom of their stroke.

Referring to the drawings, it is seen that the dough former has a generally U-shaped support frame 10 providing upper and lower support arms 11—12 and has an intermediate cam case 13. Housed in the latter for action responsive to turning of a crank 14 is the same double cam mechanism for driving a pair of forked drive arms 15—16 as in my prior Patent 2,643,621. As before, these cams are eccentrically mounted by respective hubs on a shaft 17 to which the crank 14 is pinned and are adjustable relative to one another to responsively vary the movement of the drive arms 15—16 relative to one another during their up and down strokes. This adjustment is made by loosening a wing nut 18 and moving the crank 14 together with an integral pointer 20 relative to a scale member 21, the latter being clamped to the hub of one of the cam members while the other cam member has its hub anchored to the shaft 17. It will be noted that the frame 10 also provides a downwardly exposed socket 22 for reception of a support pin and has a handle 23 for swinging the machine on the pin over a proofing screen or table as dough rings are dispensed.

The lower arm 12 has a clamp socket 24 at its free end with a locking dog 25 for holding a forming cylinder 26 between a guide collar 27 and a guard 28 made integral therewith. This guide collar is welded at the outlet of a hopper 29 and is counterbored to present an upwardly facing internal shoulder or seat 30 for receiving a metering sleeve 31 having guide fingers 31a. The hopper assembly is completed by a liner 32 which is press fitted into the cylinder 26 and projects therebeneath to provide a cut-off edge 32a to cooperate with a piston-like mandrel 33 carried at the lower end of a rod 35. A metering piston 34 larger than the mandrel is slidably mounted on the mandrel rod 35 and works in the metering sleeve 31 for up and down movement relative to the mandrel. To drive the metering piston there is provided a pair of rods 36—37 which are secured at the top to a block 38 which in turn is slidably mounted on the mandrel rod. Similarly, a second block 39 is secured to the mandrel rod and slidably receives the rods 36—37 below the block 38. Both blocks 38—39 have oppositely extending sets of respective pins 38a, 39a which interfit with bifurcated forks 15a, 16a formed at the ends of the drive arms 15—16 and straddling the blocks to effect driving of the metering piston 34 and mandrel 33 responsive to turning of the crank 14. The metering sleeve 31 is caused to travel in unison with the mandrel 33 by way of a pair of rods 40—41 and an upper bridge 42 which is sleeved at the center on an upper terminal neck portion 35a of the mandrel rod 35. The bridge shoulders against the mandrel rod proper and is held thereagainst by a wing nut 43 threaded on the neck 35a to bear against the upper face of the bridge. It will be noted that a crown bearing 44 is sleeved on the mandrel rod 35 between the bridge and the upper block 38 and seats in a clamp socket 45 provided at the free end of the upper support arm 11 in vertical alinement with the forming cylinder 26. This socket has a longitudinal access slot 46 thereto of a width slightly greater than the diameter of the mandrel rod 35 so that the latter can be laterally inserted in the socket and the crown bearing then dropped into position after the block pins 38a, 39a have been interfitted with the forks 15a, 16a and the mandrel 33 has been introduced to the forming cylinder 26. A set screw 47 clamps the crown bearing in place. When assembly is thus completed the sleeve rods 40—41 straddle the upper support arm and the two drive arms 15—16.

It should be noted that the metering sleeve 31 is purposely made sufficiently long to extend above the maximum intended height of dough in the hopper 29 so that the inside of the sleeve will be isolated from the dough. The purpose of this isolation is to permit the metering sleeve to be partially filled above the metering piston 34 with a sealing liquid 48. This liquid should be edible and compatible with the raised doughnut dough since there will be some leakage of the liquid past the metering piston. I have found that a mixture of one-half water and one-half pastry flour by volume gives a very satisfactory sealing liquid for the purposes of the present invention. Such is viscous enough to prevent ready passage of the sealing liquid by the metering piston during upstrokes thereof and yet thin enough to permit the ready escape therethrough of gases which may bleed by the metering piston during down-strokes thereof.

FIG. 6 shows a series of diagrams depicting the operation of the present device when adjusted to make a relatively large doughnut while FIG. 7 illustrates operation for a smaller doughnut. The operation in FIGS. 6 and 7 can be readily compared by considering that the movement of the mandrel 33 and metering sleeve 31 is the same in both cases, they being joined together, and that the variation between the action as shown by the two figures is had by changing the relative movement of the metering piston 34 with respect to the metering sleeve and the mandrel. As before mentioned, this change in relative movement is made by adjusting the crank 14 relative to the scale member 21 after loosening the wing nut 18 to adjust the double cam mechanism in the manner described in my prior Patent 2,643,621.

Referring first to FIG. 6, the start of the cycle is shown at A, where the metering sleeve and mandrel are at the top of their stroke, the mandrel being flush with the top of the forming cylinder 26. As the cycle continues in B, the mandrel moves downward and tends to draw dough from the hopper into the forming cylinder. Dough is also drawn into the metering sleeve. This loading of the forming cylinder and metering sleeve continues until position C, and the drawing of air from the outside is prevented during such by the sealing liquid above the metering piston and the air-tight fit of the liner 32. At point C in the cycle the mandrel leaves the liner 32 and the guide fingers 31a enter the guide collar 27. Between B and C the metering piston 34 has traveled downwardly with the sleeve and mandrel. From C to D the metering piston and mandrel move downwardly at the same rate and the guide fingers fully enter the guide collar. Since the piston and mandrel are of different diameters some dough will be expelled back into the hopper from the under edge of the metering sleeve through the slots between the guide fingers thereof. Also, dough will begin to be forced out of the bottom of the liner 32 between the edge 32a and the mandrel. During this expulsion, some of the gases in the dough from fermentation and entrapment will be forced past the metering piston into the sealing liquid thereabove as the dough in the metering sleeve and forming piston is compressed. This gas will escape up through the sealing liquid to the atmospher. Further discharge of dough and escape of gas is had by continued downward travel of the metering piston while the mandrel is at rest. This is shown by the movement from D to E. The cutoff of the doughnut is shown at F, and between F and A the cycle is completed.

As earlier indicated, the series of diagrams in FIG. 7 depicts the operation after adjustment for a smaller doughnut. This adjustment advances the cycle of the metering piston relative to the mandrel so that their movement relative to one another is not as great as for the larger doughnut. Such advancement of the metering piston takes it off its almost maximum high as shown in A and moves it well along on its down stroke as shown in AA. Consequently, as the sequences shown in BB, CC, DD, and EE follow, less dough is drawn into the metering sleeve and less dough is expelled from the bottom of the forming cylinder. However, the gas escaping action is the same as before. Between EE and FF the metering piston will move upward relative to the metering sleeve and draw back some of the discharged dough, and from FF to AA the metering piston reaches its maximum rise and again starts its descent.

Throughout these operations, a head of sealing liquid is maintained on the metering piston. This head in no way interferes with adjustment of the cam mechanism to vary the size of doughnuts to be formed and dispensed.

Of significance is the fact that the hopper 29 is necked at its lower end to provide a generally cylindrical egress portion 29a which is in spaced relation to the metering sleeve 31. During operation of the machine the up-and-down reciprocating action of the metering sleeve agitates the dough in the hopper, and particularly that in the egress portion 29a. This agitation breaks down any pockets of entrapped air or gases of fermentation so that a uniform dough feeds into the forming cylinder from the hopper. These entrapped gases gradually work their way upward to discharge to the atmosphere and this escape may be aided by providing external grooves along the metering sleeve.

The present device can be easily disassembled for cleaning merely by lifting the crown bearing 44 from its seat 45 in the support arm 11 after loosening the screw 47, and shifting the mandrel rod laterally through the access slot 46 for the seat while lifting the mandrel 33 from the forming cylinder. Then the wing nut 43 is unscrewed to remove the metering sleeve 31 and crown bearing from the mandrel rod 35.

It is thought that the invention and its advantages will have been clearly understood from the foregoing detailed description of the preferred illustrated embodiments. Minor changes in the details of construction may be resorted to without departing from the spirit of the invention and it is therefore my intention that no limitations be implied and that the hereto annexed claims be given the broadest interpretation to which the employed language fairly admits.

What I claim is:

A dough dispensing machine comprising, an upright dough hopper having a forming chamber at its lower end for discharge of dough, an open-ended metering sleeve in said hopper coacting with said chamber and axially alined therewith, said sleeve and chamber being relatively movable axially into and out of close adjacency with one another, and said sleeve extending above the level of dough in said hopper when the sleeve is closely adjacent said chamber, a mandrel slidably mounted in said chamber and having a mandrel rod extending through and above said sleeve, a metering piston slidably mounted in said sleeve and slidable on said mandrel rod, piston rod means connected to said metering piston and projecting above said sleeve to a level below the upper end of said mandrel rod, sleeve rod means extending upwardly from said metering sleeve, and bridge means interconnecting said sleeve rod means and said mandrel rod for unitary axial movement of said sleeve and mandrel, said mandrel rod being detachably connected to said bridge means, and edible sealing liquid located in said metering sleeve above said metering piston.

References Cited in the file of this patent

UNITED STATES PATENTS

| | | |
|---|---|---|
| 1,968,808 | Carpenter | Aug. 7, 1934 |
| 2,643,621 | Belshaw | June 30, 1953 |
| 2,953,106 | Jacobs | Sept. 20, 1960 |